(12) United States Patent
Weiner (10) Patent No.: US 11,995,694 B2
(45) Date of Patent: May 28, 2024

(54) SYSTEMS AND METHODS FOR IMPROVED SERVER-SIDE CONTEXTUAL PAGE ANALYSIS

(71) Applicant: GumGum, Inc., Santa Monica, CA (US)

(72) Inventor: Kenneth Weiner, Los Angeles, CA (US)

(73) Assignee: GumGum, Inc., Santa Monica, CA (US)

( * ) Notice: Subject to any disclaimer, the term of this patent is extended or adjusted under 35 U.S.C. 154(b) by 0 days.

(21) Appl. No.: 18/306,039

(22) Filed: Apr. 24, 2023

(65) Prior Publication Data
US 2024/0095784 A1 Mar. 21, 2024

Related U.S. Application Data

(63) Continuation of application No. 17/116,599, filed on Dec. 9, 2020, now Pat. No. 11,663,633.

(60) Provisional application No. 62/946,302, filed on Dec. 10, 2019.

(51) Int. Cl.
| | |
|---|---|
| G06F 9/44 | (2018.01) |
| G06F 9/54 | (2006.01) |
| G06F 18/214 | (2023.01) |
| G06F 18/24 | (2023.01) |
| G06F 40/143 | (2020.01) |
| G06F 40/40 | (2020.01) |
| G06N 20/00 | (2019.01) |
| G06Q 30/0241 | (2023.01) |
| G06V 10/764 | (2022.01) |
| G06V 10/82 | (2022.01) |

(52) U.S. Cl.
CPC .......... *G06Q 30/0277* (2013.01); *G06F 9/54* (2013.01); *G06F 18/214* (2023.01); *G06F 18/24* (2023.01); *G06F 40/143* (2020.01); *G06F 40/40* (2020.01); *G06N 20/00* (2019.01); *G06V 10/764* (2022.01); *G06V 10/82* (2022.01)

(58) Field of Classification Search
CPC .................................................. G06Q 30/0277
USPC ........................................................ 719/328
See application file for complete search history.

(56) References Cited

U.S. PATENT DOCUMENTS

| | | | | |
|---|---|---|---|---|
| 2014/0380145 | A1* | 12/2014 | Wilsher | H04L 51/18 715/234 |
| 2017/0318065 | A1* | 11/2017 | Davies | G06F 12/0862 |
| 2020/0110781 | A1* | 4/2020 | Staszak | G06F 16/9538 |
| 2020/0396258 | A1* | 12/2020 | Jeyakumar | G06N 20/00 |

* cited by examiner

*Primary Examiner* — Timothy A Mudrick
(74) *Attorney, Agent, or Firm* — Knobbe, Martens, Olson & Bear, LLP (57) ABSTRACT

Systems and methods are described for server-side contextual analysis of content available at a given uniform resource identifier (URI), which utilizes headless browser techniques to analyze a more complete and accurate version of page content than using existing techniques. For example, systems and methods are described for performing contextual analysis of content that would typically be displayed to a client device but is not included in an HTML file or other initial page source file available at the initially provided URI. The contextual analysis performed may include analyzing text using natural language processing and analyzing images using computer vision techniques.

20 Claims, 6 Drawing Sheets

SYSTEMS AND METHODS FOR IMPROVED SERVER-SIDE CONTEXTUAL PAGE ANALYSIS

CROSS-REFERENCE TO RELATED APPLICATION

This application is a continuation of U.S. patent application Ser. No. 17/116,599 filed Dec. 9, 2020, which claims the benefit of U.S. Provisional Application No. 62/946,302, filed on Dec. 10, 2019, the entirety of which are each hereby incorporated herein by reference.

BACKGROUND

Publishers of various types of news, editorial or other content often choose to present advertisements on their webpages, user interfaces, or other electronic content displayed to viewers of such content. For example, a news article presented in the form of a webpage presented to a user may include photos or other images within the webpage, text of the news article itself, as well as an advertisement included somewhere within the page. Advertisements may be presented in any of a number of known forms or formats, such as embedded within (or overlaid on top of) a portion of an underlying image that appears on the page, as a banner advertisement in its own portion of the page, as an interstitial advertisement that temporarily covers at least a portion of other page content, or as a pop-up advertisement in a separate window. Advertisements may be placed dynamically at the time of a page load by a user device as a result of the user's browser requesting an advertisement from an advertisement service's server that is referenced in code previously placed within the page by a publisher of the page, for example. If a user viewing the webpage or other user interface makes a selection (such as by a mouse click or tap gesture) within the advertisement, the user's browser or other application displaying the webpage or other user interface may load a page associated with the advertisement. This may occur, for example, by the browser sending a network request for content having a uniform resource identifier ("URI") that was previously associated with the selected advertisement.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein.

DETAILED DESCRIPTION

Generally described, aspects of the present disclosure relate to improved systems and methods for server-side contextual analysis of content available at a given uniform resource identifier (URI), which utilizes headless browser techniques to analyze a more complete and accurate version of page content than using existing techniques. For example, aspects of the present disclosure include contextual analysis of content that would typically be displayed to a client device but is not included in an HTML file or other initial page source file available at the initially provided URI. In some embodiments, the results of contextual page analysis described herein may be used to select an advertisement or other supplemental overlay content that is dynamically displayed in association with a page or other underlying content. In some embodiments, the supplemental content may be displayed over or within an image, video or other page element that appears on a webpage or other user interface. In other embodiments, the supplemental content may be displayed as a banner advertisement, a pop-up advertisement, an interstitial advertisement, and/or in some other form.

According to one embodiment, a computer-implemented method described herein may include receiving, at a server, an application programming interface (API) request to perform contextual analysis of a page, wherein the page is identified by a uniform resource identifier (URI), then initiating execution of a headless content extractor by the server, where the headless content extractor is configured to extract content included in or referenced in the page. The extracted content may include text formatted in a HyperText Markup Language (HTML) format and one or more images and/or videos (depending on the embodiment), where at least a portion of the content extracted was not included in an initial file stored at the URI but is instead requested by the headless content extractor from an external system over a network based on at least one of execution by the headless content extractor of code included in the initial file or a reference in HTML of the initial file to an additional URI or other network resource. The method may then include performing contextual analysis of the content extracted by the headless content extractor, where performing the contextual analysis may include analyzing text of the content using natural language processing and analyzing any images and/or videos using one or more computer vision techniques. The method may then include generating a response to the API request that includes results of the contextual analysis, where the results are based at least in part on the analysis of the text and the analysis of the images and/or videos (if any appeared on the page).

A headless content extractor, as described herein, may be implemented at least in part using headless browser functionality. As will be understood by one of ordinary skill in the art, a headless browser may interpret and process HTML or other code of a page in a manner similar to a standard web browser, but its output may be used for something other than display on a screen (e.g., interactions with the page may be tested in an automated manner without any actual user interface being presented). For example, a headless content extractor as described herein may receive an initial HTML page and then generate final HTML code based on a final state of a headless browser after loading additional content referenced within the page and executing associated code (such as JavaScript) included in the initial page content. In some embodiments, the headless browser operated in association with the headless content extractor may include existing "ad blocker" features so that content such as advertisements that may change frequently depending on the user viewing the page is not loaded for purposes of the contextual analysis that will be described herein (which is typically not user-specific, and may be reused across different users).

While reference will be made below to a "page" and a "browser," it will be appreciated that the disclosure herein is also applicable to contexts other than webpages and web browsers. For example, various other applications, such as applications executable on a mobile device, may present various user interfaces that include native images or video content on which overlay content as described herein may be presented. Various applications are configured to process HTML, including email clients and social media applications, such that only minor modifications, if any, enable the above methods to be implemented in a variety of contexts other than a browser.

Figure 1A:
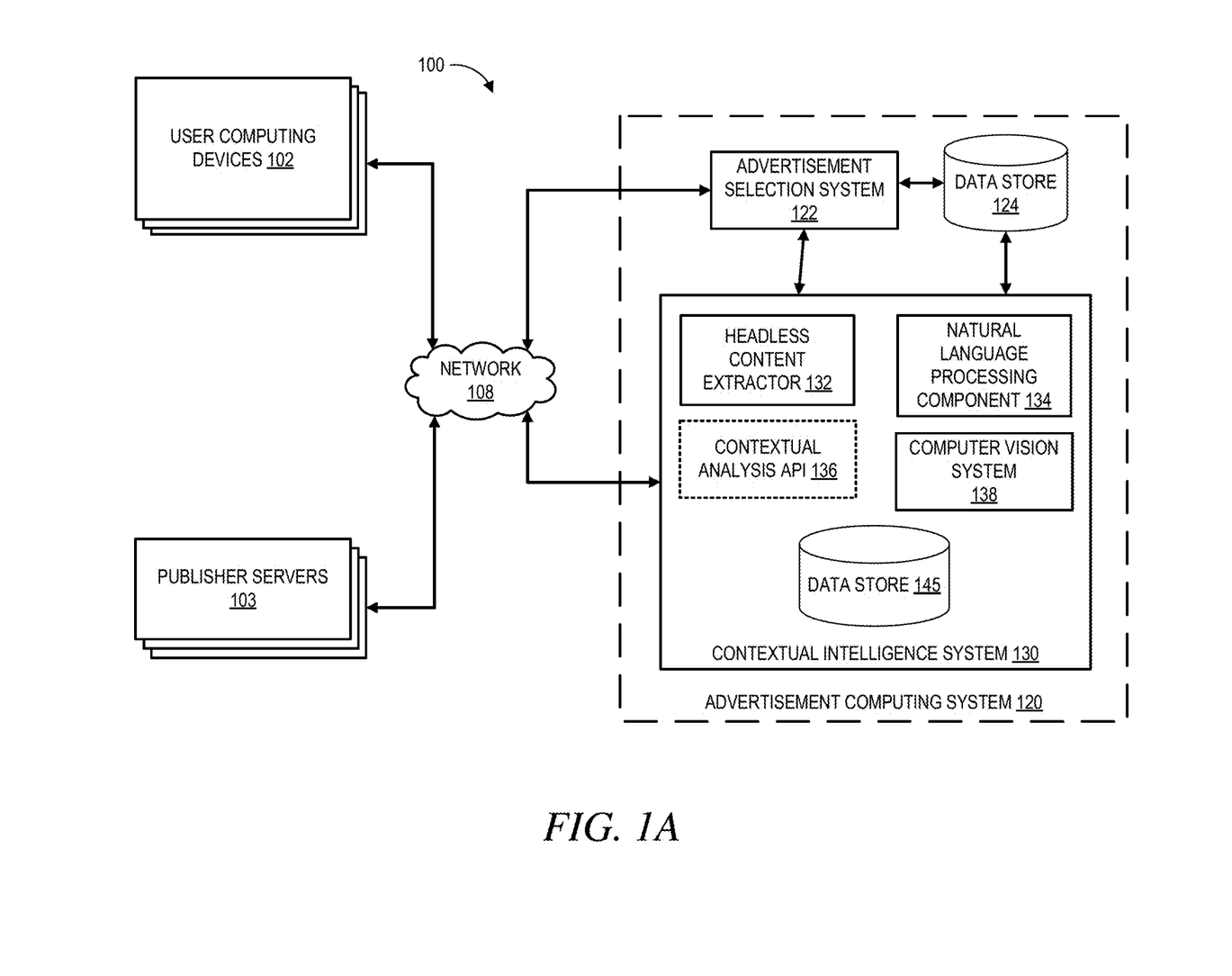
FIG. 1A is an illustrative operating environment for performing contextual analysis of content and selecting an advertisement for display in association with the content, according to some embodiments.

FIG. 1A is an illustrative operating environment 100 for performing contextual analysis of content and selecting an advertisement for display in association with the content, according to some embodiments. In the illustrated embodiment, an advertisement computing system 120 may be in communication with a number of different user computing devices 102 and publisher servers 103 over a network 108, such as the Internet. The advertisement computing system 120 may be operated in association with an advertisement service that different website publishers have partnered with to present advertisements on pages of those publishers' websites.

The user computing devices 102 may be devices operated by users who request a URI from one of the publisher servers 103 for display via a browser or other application operated on the user's device, which in turn may cause the browser to request advertisement content from the advertisement computing system 120. The advertisement computing system 120 includes an advertisement selection system 122, which may be local or remote communication with a data store 124 and a contextual intelligence system 130. The contextual intelligence system 130 may generally provide the advertisement selection system 122 with results of contextual analysis of a given page that may be used in the advertisement selection process, as will be further described herein. The contextual intelligence system 130 may include a contextual analysis API 136, headless content extractor 132, natural language processing component 134, computer vision system 138, and data store 145, each of which will be described further below with respect to other figures.

Figure 1B:
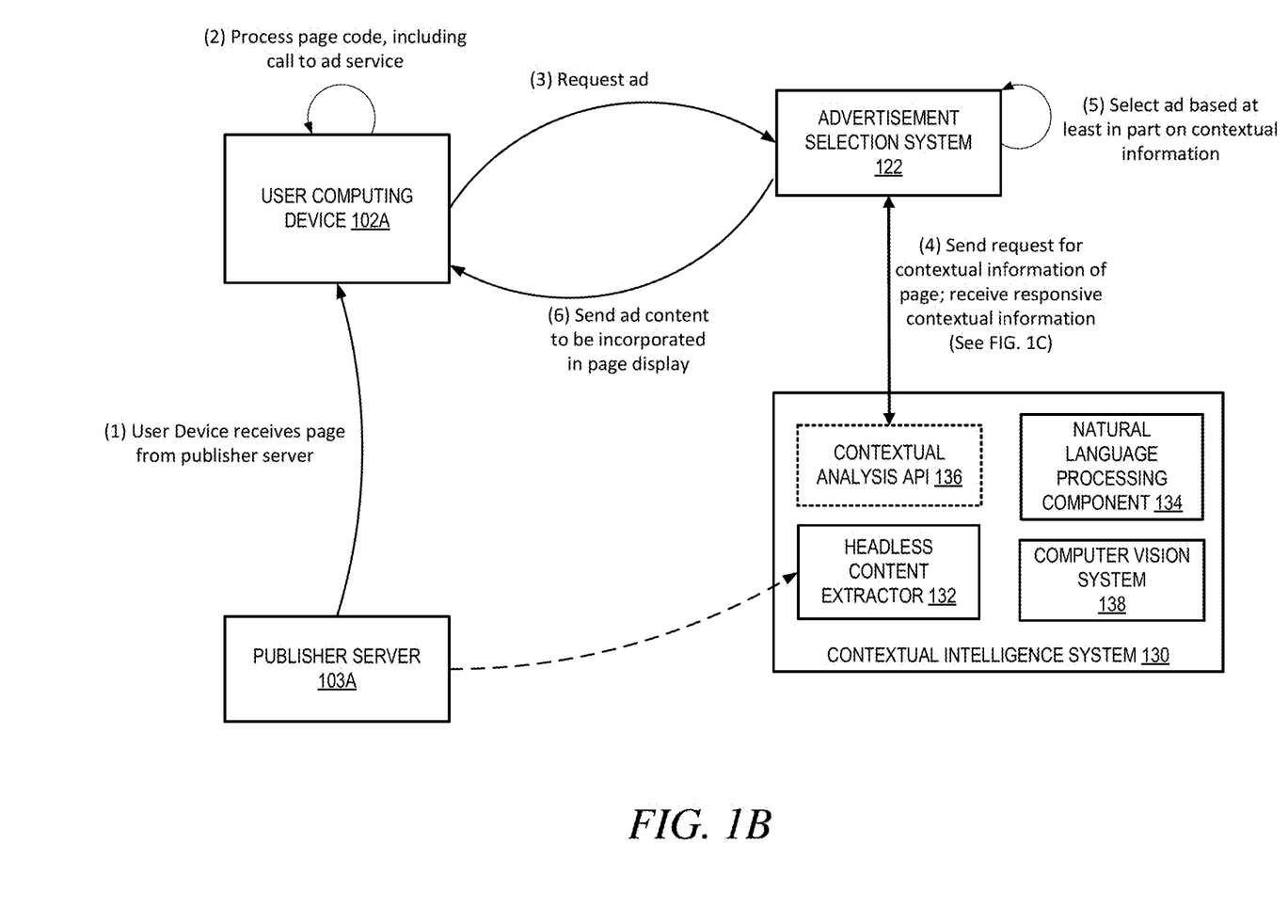
FIG. 1B provides an illustrative data flow within the environment of FIG. 1A, according to some embodiments.

FIG. 1B provides an illustrative data flow within the environment of FIG. 1A, according to some embodiments. The data flow begins with (1) the user computing device 102A requesting and receiving page content from a publisher server 103A. For example, a browser or other application operating on the user computing device 102A may request page content associated with a URI hosted by the publisher server 103A, which may be returned by the publisher server 103A as an HTML file. The browser or other application of the user computing device 102A may then (2) process the HTML and other code of the page (such as JavaScript or other scripts) to generate page content for display to the user operating the user computing device 102A. In the illustrated example, the page may include a reference to the advertisement selection system 122. For example, a JavaScript tag may have been included in the page code by the publisher of the page at the direction of an operator of the advertisement service. In some embodiments, the tag may be placed directly in a webpage's HTML, such as in the footer of the HTML. In other embodiments, the JavaScript may be loaded through a publisher's ad server. When the user device's browser loads the page, the JavaScript or other code placed within the HTML or other page code may cause the browser to request additional code from the advertisement selection system 122, which may be considered a request for advertisement content to be selected by the advertisement selection system 122 and returned to the user device for integrated display within the page.

In response to the ad request being received as step (3), the advertisement selection system 122 may (4) send a request for contextual information of the page to the contextual intelligence system 130, as will be further described below with respect to FIG. 1C. The request to the contextual analysis API 136 of the contextual intelligence system may include an indication of the URI of the underlying page to be analyzed. The remainder of steps referenced in FIG. 1B may be in an instance in which the contextual analysis system returns a result of a contextual analysis of the page to the advertisement selection system substantially in real time with display of the page on the user computing device 102A. In some other instances according to some embodiments, the contextual intelligence system may add the page to a queue to be analyzed such that no advertisement is served for the given page request from device 102A (such as if this is the first time an ad has been requested for the given URI), but where a later request for an ad to be displayed on a displayed page associated with this same URI may be returned quickly by the API 136 and an ad served in that second instance.

Once the API 136 returns responsive contextual information regarding the page, the advertisement selection system 122 may (5) select an advertisement to be displayed on the page based at least in part on the contextual information. The contextual information may include information such as various keywords associated with the page, event categories, content categories, threat categories or other brand safety information, and/or other data.

Once the system 122 selects an advertisement or other overlay content to be presented by the user device 102A, the system 122 may retrieve or assemble a package that includes one or more media assets (such as images, video data and/or other visual media assets), along with additional code that can be executed at the user device and which causes the user device (in combination with code that may have been previously delivered to the user device) to present the advertisement and/or other content for display. In one embodiment, the package may include, for example, HTML, JavaScript, JavaScript Object Notation ("JSON"), and image assets that can be assembled by the user device according to code in the package (e.g., according to the HTML, JavaScript and JSON portions of the package) for display over an image or other page element. The package may include (such as in a JSON portion of the package) advertisement tracking data (including, for example, tracking pixels, which are known in the art), as well as information regarding a URI to be requested if the advertisement is "clicked" or otherwise selected by a user. In some embodiments, the package may include additional information, such as video or animation data, sound files, and/or links to additional third-party hosted content for incorporation into an overlay content display. Overlay content packages are described further in co-pending U.S. patent application Ser. No. 15/951,762, filed Apr. 12, 2018 and entitled "MAINTAINING PAGE INTERACTION FUNCTIONALITY WITH OVERLAY CONTENT," which is hereby incorporated by reference in its entirety herein.

The advertisement selection system 122 may (6) send to the user device 102A the advertisement content package, including the additional code that, when executed, will cause the user device (e.g., via a browser or other application operating on the user device) to display overlay content at a specific position on the page (where the advertisement content may be overlaid on an image or video within the page, in some embodiments). As one example, the user device 102A may cause display of an advertisement or other overlay content over a portion of an image, video, page portion (such as may be identified by a <div> tag in HTML of the page) or other element of the page. Displaying the advertisement may include executing additional code in a received data package (in combination with execution of code previously resident on the page and/or previously delivered by a server, in some embodiments). In the case of an image as the underlying page element, executing the code may cause the client device to place a container or drawing canvas over the image or a portion of the image within the page. The code may then cause the user device to render the HTML content of the overlay content package (potentially including executing other embedded or associated code) within the newly created container.

The client device may present image or video data from the overlay content package for display within the container, such that an overlay image or video appears to be on top of the underlying page image or within the underlying page image. While examples of overlay content that appears as a banner or rectangle over a bottom portion of an image are discussed below with respect to FIG. 4B, many other forms of overlay content may be displayed in certain embodiments. More details regarding displaying overlay content and handling user interaction with overlay content are described in co-pending U.S. patent application Ser. No. 15/951,762, incorporated by reference above.

While FIG. 1B has been described with reference to an embodiment in which the contextual intelligence system 130 generates contextual information in response to advertisement requests from user devices, the contextual intelligence system may additionally or alternatively generate contextual information regarding pages in other manners in some embodiments. As one example, in some instances, page URIs may be passed between advertising companies and/or other entities in programmatic bid requests, and one of these entities may wish to utilize the contextual intelligence system to obtain contextual information regarding the URI(s) (such as to use the contextual information in association with the entity's bid determinations). In such an example, one or more of these companies or entities may send a URI to the contextual intelligence system (such as via an API call) as part of a request to receive contextual data in return, which may cause the contextual intelligence system to generate contextual information for the URI as described above. As another alternative, a publisher's content management system or other computing system or server may interface with the contextual intelligence system to associate contextual data with the publishers' pages as they are published. In such an example, the contextual intelligence system may generate contextual information regarding a page prior to any user requesting an advertisement for that page (with this contextual information then being retrieved for use once the first viewing user's request for an advertisement is received).

Figure 1C:
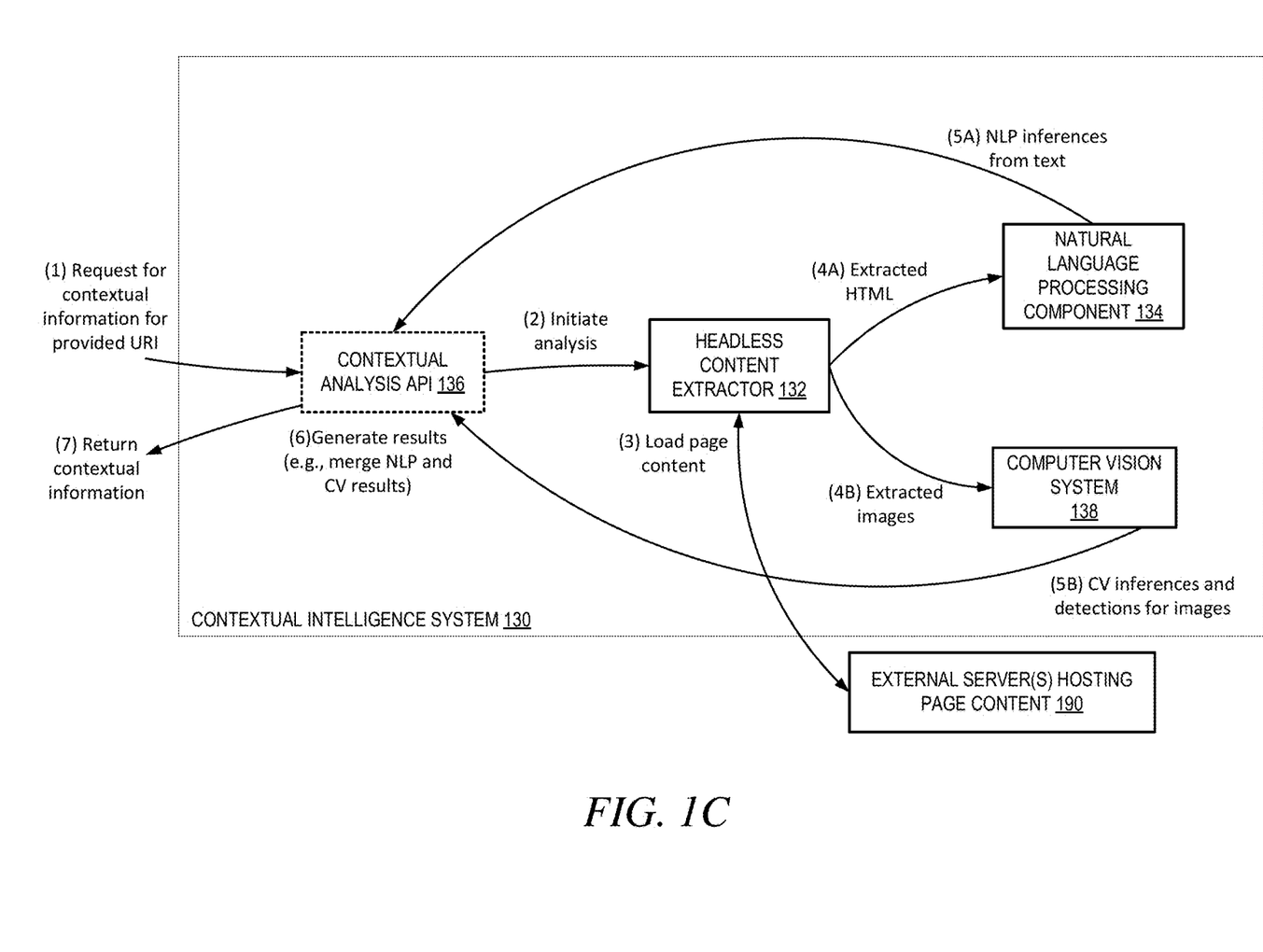
FIG. 1C provides an illustrative data flow for performing contextual page analysis using a contextual intelligence system as described herein, according to some embodiments.

FIG. 1C provides an illustrative data flow for performing contextual page analysis using a contextual intelligence system as described herein, according to some embodiments. The illustrative flow begins with (1) the contextual analysis API 136 of the contextual intelligence system 130 receiving a request for contextual information for a page identified by a URI included within the request. The request may be, for example, an API call made by the advertisement selection system 122. The contextual analysis API component 136 of the contextual intelligence system may generally be responsible for receiving and responding to API requests, as well as initiating and merging results of the various other components 132, 134 and 138 of the contextual intelligence system to generate the responsive data. FIG. 1C will be described with respect to an instance in which the contextual intelligence system 130 completes a full contextual analysis of a given page. In other instances, as will be described below with respect to FIG. 2, a previously performed contextual analysis of a page may be reused for ad selection associated with a subsequent page view.

The contextual analysis API (2) initiates the analysis by causing the contextual intelligence system to initiate execution of the headless content extractor 132 to extract content of the page for further analysis. For example, the headless content extractor may request the HTML or other initial file at the provided URI, as hosted at an external server. The headless content extractor may then generate final HTML code or other page representation based on a final state of a headless browser after loading additional content referenced within the page and executing associated code (such as JavaScript) included in the initial page content. As discussed, the headless browser operated in association with the headless content extractor may include existing "ad blocker" features so that content such as advertisements that may change frequently depending on the user viewing the page is not loaded. As is known in the art, ad blocker functionality may operate by storing various rules that block content by its source (such as blocking outgoing HTTPS requests associated with known ad platforms) or by specific identified code (such as identifying known scripts that various advertisement platforms instruct publishers to include in their pages), among other methods.

Implementing aspects of a headless browser in association with the headless content extractor may provide various advantages over simply passing the initial page information of the initial returned HTML file at the provided URI to the components 134 and 138. For example, various scripts or code (such as JavaScript libraries used to reference and implement various third-party functionality integrated within the page) may be embedded or referenced within the initial HTML content, which upon execution by a browser (whether a standard browser or headless browser) may cause additional text, multimedia and/or other content to be loaded as part of the page. By considering this additional text, additional images, and/or other additional information that would be displayed to a user in a real world viewing instance, the contextual intelligence system may generate more accurate and complete contextual information that represents context of the page as it would typically be displayed as opposed to context as the page exists in its initial HTML state.

Once a final representation of the page content has been generated by the headless content extractor 132, the extracted HTML and/or other text may be provided to the natural language processing component 134 at step (4A). In parallel or sequentially, the extracted images and/or other multimedia content (such as images, video, and/or other visual content that would be displayed to a user as part of the loaded page) may be provided to the computer vision system 138 at step (4B). The natural language processing component may generate (and provide to the API 136) various inferences or other results determined based on the extracted HTML and/or other text. In parallel or sequentially, the computer vision system 138 may generate (and provide to the API 136) various computer vision inferences or other results determined based on the extracted images, video and/or other media. The content passed to the natural language processing component 134 and/or other text analysis component may include text content other than text and HTML within the page itself, such as including the page title, headline, and/or various metadata. The images and/or videos passed to the computer vision system may be only a subset of the total images and/or videos within the page, such as only those meeting a minimum size threshold or other criteria.

The natural language processing component 134 may employ various natural language processing techniques, machine learning techniques, and/or other approaches to determining context of a page's text and output determinations of information such as safety threats (such as whether the page is inappropriate for ads, includes adult content, illegal content, etc.), content categories or keywords (such as those representing topics or subject matter discussed in the text content), event categories or keywords (such as real world events discussed in the text, such as an upcoming sports event or political event), and/or other keywords associated with the text content. In some embodiments, the event categories may be determined using one or more methods described in co-owned U.S. application Ser. No. 15/602,706, entitled "Automated Classification of Network-Accessible Content Based on Events," filed May 23, 2017, which is hereby incorporated by reference herein. The natural language processing component 134 may additionally analyze sentiment of the content in addition to subject matter.

The methods employed by the computer vision system 138 to analyze the extracted images or other media may include various machine learning techniques to identify objects depicted in the media, such as convolutional neural networks trained to identify company logos and real world objects depicted in the media. Objects detected (such as a certain company's logo, a real world object such as a particular model car, a certain celebrity, a real world location, an animal, faces, and/or many others) may be output by the computer vison system 138 as a certain classification label associated with a corresponding keyword or category. In some embodiments, the images may be analyzed to determine brand safety, which may be based in part on a level of nudity or skin showing in the images. Some such techniques for determining image safety are described in co-owned U.S. application Ser. No. 14/196,695, entitled "Systems and Methods for Determining Image Safety," filed Mar. 4, 2014, which is hereby incorporated by reference herein.

The results from the computer vision system 138 and the natural language processing component 134 may be merged and/or otherwise considered in combination to produce a responsive object at step (6) that is returned as responsive contextual information at step (7). For example, the contextual information may include lists of keywords and/or categories, and may additionally include Boolean values (such as whether the content is safe for advertisements), enumerated values (such as a brand safety value such as "very safe," "moderately safe," "unsafe"), and/or numeric values (such as a safety score or contextual relevancy score). The results may be returned to the advertisement selection system 122 and/or stored in association with the URI of the analyzed page in data store 145 and/or data store 124.

Figure 2:
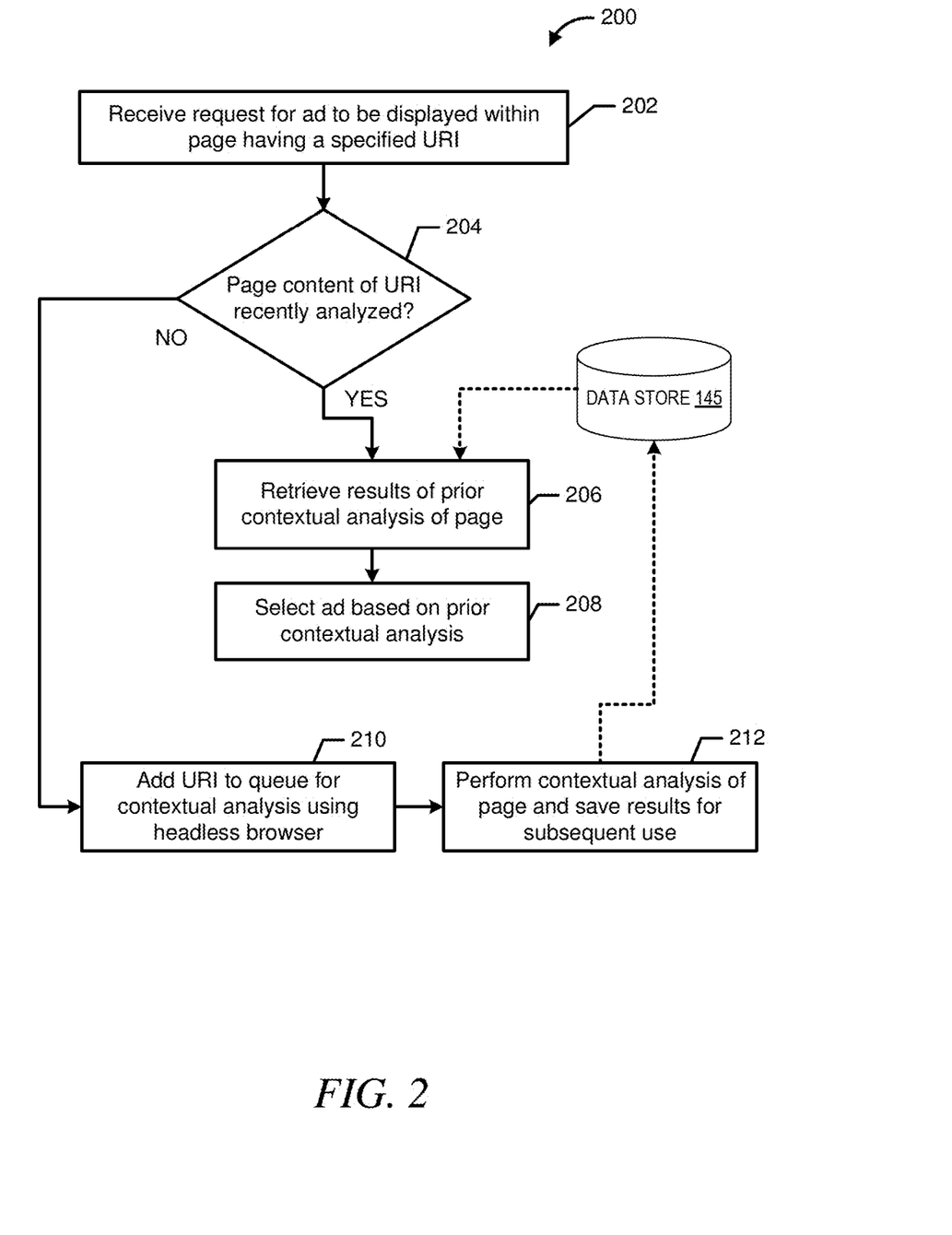
FIG. 2 is a flow diagram of an illustrative method for determining whether to perform contextual page analysis for a specific page prior to selecting an advertisement, according to some embodiments.

FIG. 2 is a flow diagram of an illustrative method 200 for determining whether to perform contextual page analysis for a specific page prior to selecting an advertisement, according to some embodiments. The method 200 may be performed, in some embodiments, by the advertisement computing system 120. Individual blocks of method 200 may be performed by the advertisement system 122 or the contextual intelligence system 130, depending on the embodiments.

The method 200 begins at block 202, where the advertisement computing system 120 receives a request for an advertisement or other supplemental content to be displayed within a page having a specific URI identified in the request. For example, the request may be a result of a particular user computing device loading an HTML file (retrieved from the specified URI) for display and requesting an advertisement to display in conjunction with the page display. At decision block 204, the advertisement computing system 120 may determine whether the page content of the page at the specified URI has been recently analyzed by the contextual intelligence system (e.g., whether there is already information representing the results of a contextual analysis of the given page stored in a data store for reuse). In some embodiments, contextual page analysis results for a given URI may be stored for a set time, such as one day, one week, one month, or other time period, before being either deleted or refreshed with an analysis of a current version of the page.

If the advertisement computing system 120 determines at block 204 that no cached context information is stored for the given URI, the method may proceed to block 210 where the advertisement computing system 120 adds the URI to a queue for contextual analysis using the headless content extractor 132. Subsequently (which may be immediately in some instances, or may be after some delay or initiation of a batch processing procedure), the advertisement computing system 120 may perform the contextual analysis of the page and save the results in data store 145 at block 212. In instances in which the contextual analysis will not be performed immediately or in substantially real time with respect to a current viewing of the page by a particular user, the given user may not receive any ad content for display.

If instead the advertisement computing system 120 determines at block 204 that cached context information is stored for the given URI (and has not expired), the method may proceed to block 206, where the advertisement computing system 120 retrieves the prior contextual analysis of the page as stored in data store 145. At block 208, the advertisement computing system 120 may then select an ad or other supplemental content for display in association with the page based on the retrieved contextual analysis.

Figure 3:
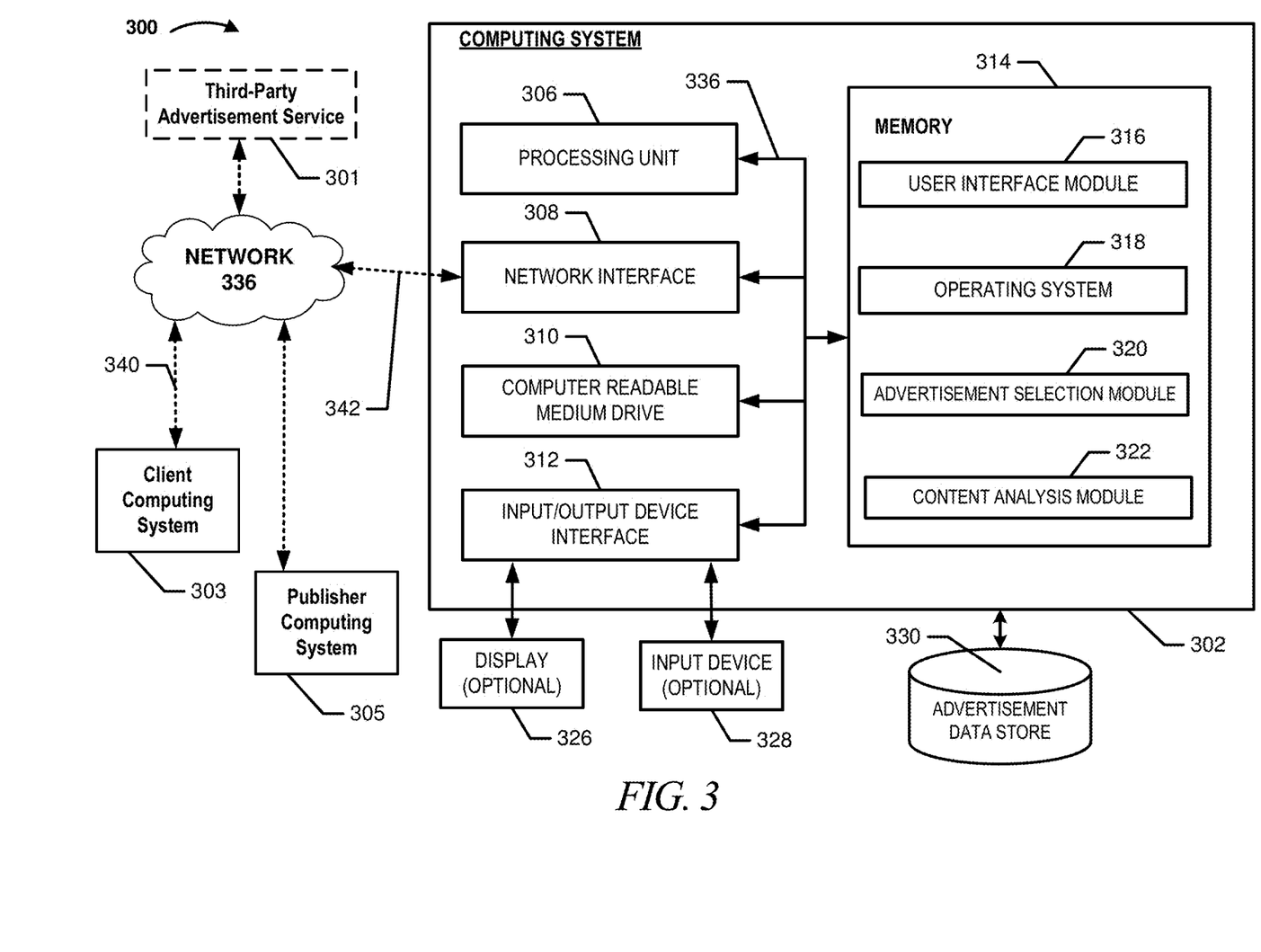
FIG. 3 is a system block diagram of a computing environment suitable for use in various embodiments of the present disclosure.

FIG. 3 illustrates a general architecture of a computing environment 300, according to some embodiments. As depicted in FIG. 3, the computing environment 300 may include a computing system 302. The general architecture of the computing system 302 may include an arrangement of computer hardware and software components used to implement aspects of the present disclosure. The computing system 302 may include many more (or fewer) elements than those shown in FIG. 3. It is not necessary, however, that all of these generally conventional elements be shown in order to provide an enabling disclosure. In some embodiments, the computing system 302 may be an example of what is referred to as the advertisement computing system above.

As illustrated, the computing system 302 includes a processing unit 306, a network interface 308, a computer readable medium drive 310, an input/output device interface 312, an optional display 326, and an optional input device 328, all of which may communicate with one another by way of a communication bus 336. The processing unit 306 may communicate to and from memory 314 and may provide output information for the optional display 326 via the input/output device interface 312. The input/output device interface 312 may also accept input from the optional input device 328, such as a keyboard, mouse, digital pen, microphone, touch screen, gesture recognition system, voice recognition system, or other input device known in the art.

The memory 314 may contain computer program instructions (grouped as modules or components in some embodiments) that the processing unit 306 may execute in order to implement one or more embodiments described herein. The memory 314 may generally include RAM, ROM and/or other persistent, auxiliary or non-transitory computer-readable media. The memory 314 may store an operating system 318 that provides computer program instructions for use by the processing unit 306 in the general administration and operation of the computing system 302. The memory 314 may further include computer program instructions and other information for implementing aspects of the present disclosure. For example, in one embodiment, the memory 314 may include a user interface module 316 that generates user interfaces (and/or instructions therefor) for display upon a computing system, e.g., via a navigation interface such as a browser or application installed on the computing system 302 or the client computing system 303.

In some embodiments, the memory 314 may include an advertisement selection module 320 and content analysis module 322, which may be executed by the processing unit 306 to perform operations according to various embodiments described herein. The modules 320 and/or 322 may access the data store 330 in order to retrieve data described above and/or store data. The data store may be part of the computing system 302, remote from the computing system 302, and/or may be a network-based service. The advertisement data store 330 may store various advertisement or other overlay content and information, such as images, video, text, associated rules for when to display given overlay content, bid information, keyword information, code packages that instruct a browser or application how to display given overlay content, and/or other data or content.

In some embodiments, the network interface 308 may provide connectivity to one or more networks or computing systems, and the processing unit 306 may receive information and instructions from other computing systems or services via one or more networks. In the example illustrated in FIG. 3, the network interface 308 may be in communication with a client computing system 303 via the network 336, such as the Internet. In particular, the computing system 302 may establish a communication link 342 with a network 336 (e.g., using known protocols) in order to send communications to the computing system 303 over the network 336. Similarly, the computing system 303 may send communications to the computing system 302 over the network 336 via a wired or wireless communication link 340. In some embodiments, the computing system 302 may additionally communicate via the network 336 with an optional third-party advertisement service 301, which may be used by the computing system 302 to retrieve advertisement data to be delivered to a client computing system 303. Depending on the embodiment, the computing system 302 may be configured to retrieve advertisement data from either advertisement data store 330 or third-party advertisement service 301 depending on various information, such as publisher page information, keywords, image information, advertiser preference, comparison of bid information, and/or other factors. The computing system 302 may additionally be in communication with a publisher computing system 305 and/or other third-party servers to retrieve content to be analyzed for context as described herein.

Those skilled in the art will recognize that the computing systems 302 and 303 may be any of a number of computing systems including, but not limited to, a laptop, a personal computer, a personal digital assistant (PDA), a hybrid PDA/mobile phone, a mobile phone, a smartphone, a wearable computing device, an electronic book reader, a digital media player, a tablet computer, a gaming console or controller, a kiosk, an augmented reality device, another wireless device, a set-top or other television box, one or more servers, and the like. The client computing system 303 may include similar hardware to that illustrated as being included in computing system 302, such as a display, processing unit, network interface, memory, operating system, etc. In some embodiments, the client computing system 303 may perform a number of features described above (such as displaying a page, requesting overlay content, supplementing display of the page with overlay content, etc.) based in part on a browser or other application operating on the client computing system 303 executing code received over the network from the computing system 302, the publisher computing system 305, and/or other network-accessible server or service.

Figure 4A:
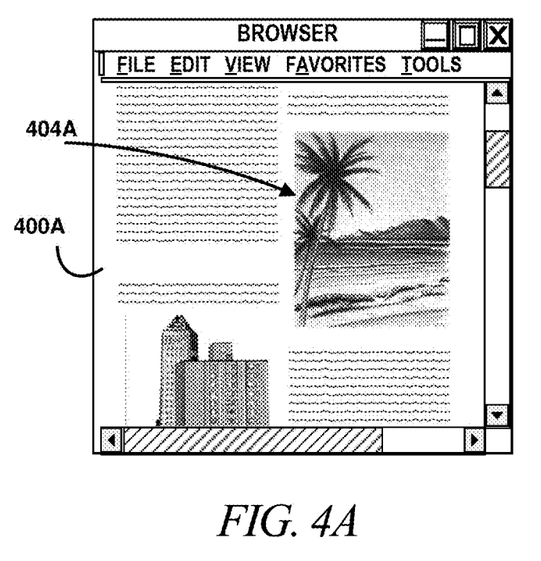
FIGS. 4A and 4B illustrate a displayed page both prior to selection of an advertisement and then subsequent to an overlay advertisement being displayed over an underlying page image.
Figure 4B:
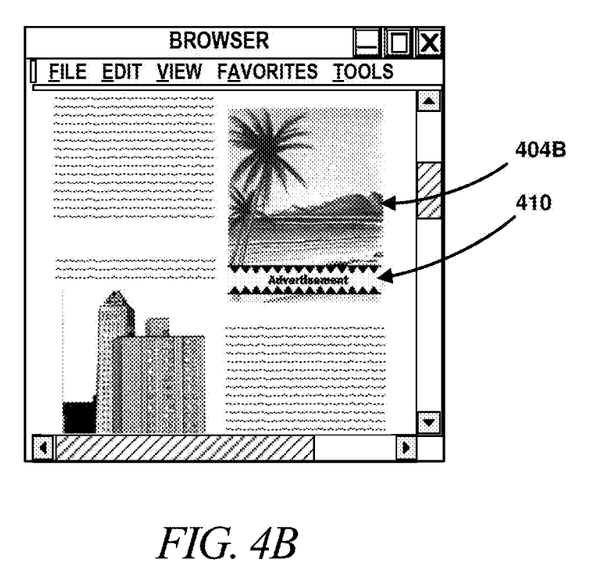

FIGS. 4A and 4B illustrate a displayed page 400A prior to selection of an advertisement (in FIG. 4A) and subsequent to an overlay advertisement 410 being displayed over the underlying page image 404B (in FIG. 4B). In the illustrated example, the page is displayed in a browser window. The page includes lines of text (represented in the figures as lines), as well as images. As will be appreciated, a page may contain many other types of content.

FIG. 4A may represent the page 400A at the time it is first displayed on a client computing system. The page includes a first image 404A (including rendered text within the image represented as lines) as well as a second image. Each of the two images may be considered a different element of page 400A. These images, as well as others on the page that are not in view, may be identified by code of the page upon initial page load, such as by code analyzing the page and identifying references within the HTML to URIs of those page images.

FIG. 4B may represent the same page as in FIG. 4A above, but may be following an update to the display of the page (which may be less than a second after the initial page load, in some embodiments) to incorporate an advertisement 410 that was selected by an advertisement service based at least in part on the contextual analysis approaches described herein. As illustrated, overlay content 410 in the form of an advertisement has been added over a portion of image 404B. As will be appreciated by one of ordinary skill in the art, the overlay content 410 may be selectable by a user to navigate to a landing page associated with the advertisement, and the advertisement may move with the image (such that it appears to be pegged to the image or part of the image) as the user continues to scroll through the page.

While in-image advertisements are described above as examples, it will be appreciated that aspects of the disclosure provide improvements for many other types of overlay content. For example, overlay content as described herein may be presented over video content, Flash objects, a portion of a page itself, or other content of a webpage or user interface besides a static image. In one embodiment, overlay content that is bound to a portion of a page itself rather than to a single media object may be configured to visually collapse or minimize after a predetermined time (such as five seconds), or in response to a user request to hide the overlay content.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more general purpose computers or processors. The code modules may be stored in any type of non-transitory computer-readable medium or other computer storage device. Some or all the methods may alternatively be embodied in specialized computer hardware. In addition, the components referred to herein may be implemented in hardware, software, firmware or a combination thereof.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks, modules, and algorithm elements described in connection with the embodiments disclosed herein can be implemented as electronic hardware, computer software, or combinations of both. To clearly illustrate this interchangeability of hardware and software, various illustrative components, blocks, modules, and elements have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, or algorithm described in connection with the embodiments disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A computer system comprising:
    memory; and
    a processor in communication with the memory and configured with processor-executable instructions to perform operations comprising:
        receiving a request to perform contextual analysis of a page, wherein the page is accessible over a network via a uniform resource identifier (URI);
        send a network request for the page via the URI;
        receive an initial file in response to the network request;
        initiating execution of a headless content extractor, wherein the headless content extractor is configured to extract content included in or referenced in the initial file without causing display of the content, wherein at least a portion of the content extracted is not included in the initial file accessible via the URI but is requested from an external system over the network based at least in part on execution by the headless content extractor of code included in the initial file;
        performing contextual analysis of the content extracted by the headless content extractor, including contextual analysis of the portion of the content not included in the initial file; and
        storing, in an electronic data store, keywords associated with the page determined from the results of the contextual analysis, wherein storing the keywords includes associating the keywords with the URI in the electronic data store.

2. The computer system of claim 1, wherein the content extracted by the headless content extractor includes one or more images or videos, and wherein performing the contextual analysis of the content includes analyzing at least a portion of the one or more images or videos using one or more machine learning models.

3. The computer system of claim 1, wherein the keywords include at least a topic discussed in text of the content extracted by the headless content extractor.

4. The computer system of claim 1, wherein the keywords include at least a name of an object determined by a machine learning model to be depicted in an image included in the content extracted by the headless content extractor.

5. The computer system of claim 1, wherein the headless content extractor comprises a headless browser that processes at least HTML of the page to produce output without causing display of the output.

6. The computer system of claim 5, wherein the headless browser blocks advertisement content, such that the content extracted by the headless content extractor excludes content hosted by or associated with an advertisement service.

7. The computer system of claim 1, wherein the processor is further configured to perform additional operations comprising:
    receiving an indication that the page is being viewed at a user device;
    selecting an advertisement to present on the page based at least in part on the results of the contextual analysis;
    assembling a package that includes one or more media assets and additional code configured for execution at the user device and which causes the user device to present the advertisement for display within the page; and
    sending, over a network, the package to the user device.

8. The computer system of claim 7, wherein the package comprises HTML, JavaScript, JavaScript Object Notation ("JSON") data, and one or more images that are positioned for display by the user device according to the additional code in the package.

9. The computer system of claim 1, wherein the processor is further configured to perform additional operations comprising:
    determining that the page is not appropriate for presenting advertisements based at least in part on contextual analysis of the portion of the content that is not included in the initial file stored at the URI but is requested from the external system, wherein the page is determined not to be appropriate for presenting advertisements based on a determination that the portion of the content includes at least one of adult content or illegal content, and
    storing in the electronic data store an indication that the page is not appropriate for presenting advertisements.

10. A computer-implemented method comprising:
    receiving a request to perform contextual analysis of a page, wherein the page is accessible over a network via a uniform resource identifier (URI);
    send a network request for the page via the URI;
    receive an initial file in response to the network request;
    initiating execution of a headless content extractor, wherein the headless content extractor is configured to extract content included in or referenced in the initial file without causing display of the content, wherein at least a portion of the content extracted is not included in the initial file accessible via the URI but is requested from an external system over the network based at least in part on execution by the headless content extractor of code included in the initial file;
    performing contextual analysis of the content extracted by the headless content extractor, including contextual analysis of the portion of the content not included in the initial file; and
    storing, in an electronic data store, keywords associated with the page determined from the results of the contextual analysis, wherein storing the keywords includes associating the keywords with the URI in the electronic data store.

11. The computer-implemented method of claim 10, wherein the content extracted by the headless content extractor includes one or more images or videos, and wherein performing the contextual analysis of the content includes analyzing at least a portion of the one or more images or videos using one or more machine learning models that implement computer vision techniques.

12. The computer-implemented method of claim 10, wherein the one or more keywords include a name of a real world event referenced in text of the content extracted by the headless content extractor.

13. The computer-implemented method of claim 10, wherein the headless content extractor comprises a headless browser that processes at least HTML of the page to produce output without causing display of the output.

14. The computer-implemented method of claim 13, wherein the headless browser blocks advertisement content, such that the content extracted by the headless content extractor excludes content hosted by or associated with an advertisement service.

15. The computer-implemented method of claim 10 further comprising:
receiving an indication that the page is being viewed at a user device;
selecting an advertisement to present on the page based at least in part on the results of the contextual analysis;
assembling a package that includes one or more media assets and additional code configured for execution at the user device and which causes the user device to present the advertisement for display within the page; and
sending, over a network, the package to the user device.

16. The computer-implemented method of claim 10 further comprising:
determining that the page is not appropriate for presenting advertisements based at least in part on contextual analysis of the portion of the content that is not included in the initial file stored at the URI but is requested from the external system; and
storing, in the electronic data store accessible to the server, a value indicating that the page is not appropriate for presenting advertisements.

17. The computer-implemented method of claim 16 further comprising:
receiving, at the server, a subsequent request for an advertisement to present at a client device in association with the page, wherein the subsequent request identifies the page by the URI;
retrieving from the electronic data store, based on the URI, the value indicating that the page is not appropriate for presenting advertisements; and
determining not to send any advertisement content to the client device in response to the subsequent request based on the value.

18. A computer-readable, non-transitory storage medium storing computer executable instructions that, when executed by one or more computer systems, configure the one or more computer systems to perform operations comprising:
receiving a request to perform contextual analysis of a page, wherein the page is accessible over a network via a uniform resource identifier (URI);
send a network request for the page via the URI;
receive an initial file in response to the network request;
initiating execution of a headless content extractor, wherein the headless content extractor is configured to extract content included in or referenced in the initial file without causing display of the content, wherein at least a portion of the content extracted is not included in the initial file accessible via the URI but is requested from an external system over the network based at least in part on execution by the headless content extractor of code included in the initial file;
performing contextual analysis of the content extracted by the headless content extractor, including contextual analysis of the portion of the content not included in the initial file; and
storing, in an electronic data store, keywords associated with the page determined from the results of the contextual analysis, wherein storing the keywords includes associating the keywords with the URI in the electronic data store.

19. The computer-readable, non-transitory storage medium of claim 18, wherein the computer executable instructions implement at least a portion of an application programming interface (API) configured to receive requests from one or more advertising platforms, wherein the keywords are provided via the API to a first advertising platform in response to a programmatic bid request for an advertisement received from the first advertising platform.

20. The computer-readable, non-transitory storage medium of claim 18, wherein the operations further comprise analyzing one or more images included in the content extracted by the headless content extractor using one or more convolutional neural networks trained to identify objects in images.

* * * * *